No. 780,780. PATENTED JAN. 24, 1905.
C. R. CULLEY.
NOZZLE.
APPLICATION FILED APR. 29, 1904.
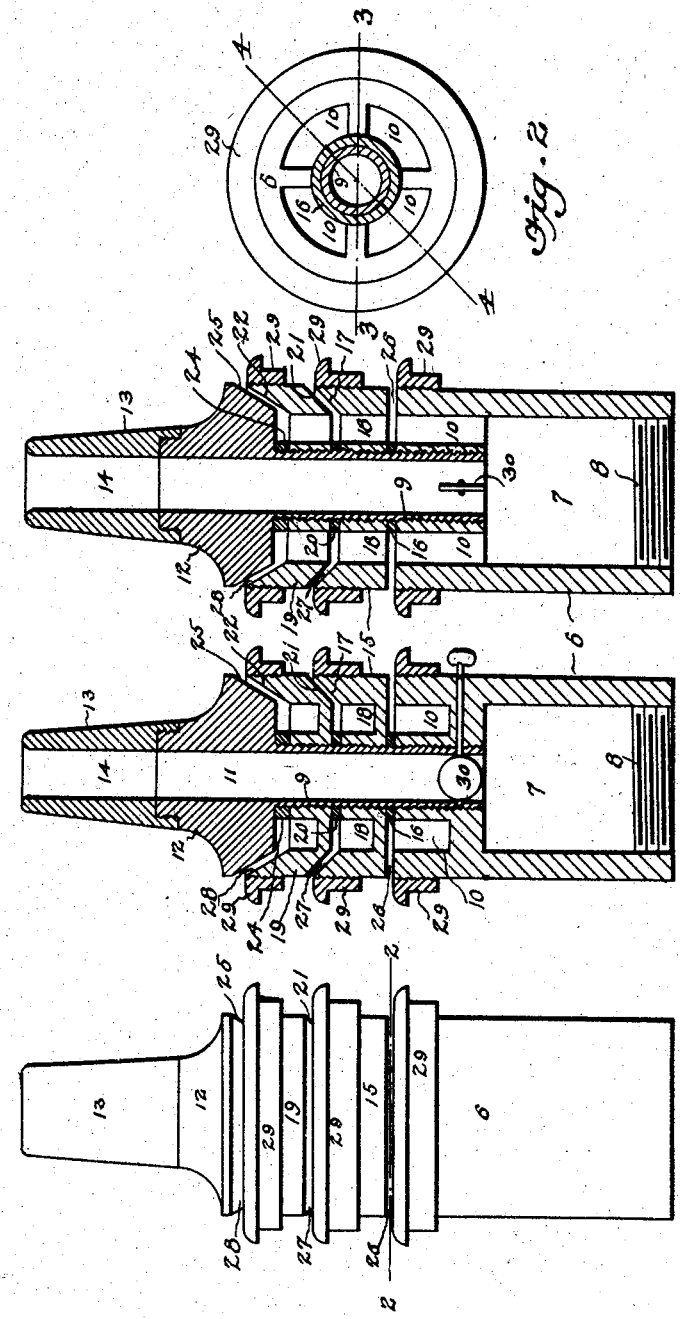
Witnesses
F. A. Barron.
M. A. Schmidt.
Carl R. Culley, Inventor
by
Milo B. Stevens & Co.
Attorneys.

No. 780,780.                                                               Patented January 24, 1905.

UNITED STATES PATENT OFFICE.

CARL R. CULLEY, OF NORWALK, OHIO.

NOZZLE.

SPECIFICATION forming part of Letters Patent No. 780,780, dated January 24, 1905.

Application filed April 29, 1904. Serial No. 205,521.

*To all whom it may concern:*

Be it known that I, CARL R. CULLEY, a citizen of the United States, residing at Norwalk, in the county of Huron and State of Ohio, have invented new and useful Improvements in Nozzles, of which the following is a specification.

My invention relates to nozzles, and has for its object to produce a central as well as a number of side discharges, together with means for independently controlling the latter whereby any one or all may be shut off.

In the accompanying drawings, Figure 1 is an elevation of the nozzle. Fig. 2 is a cross-section on the line 2 2 of Fig. 1. Fig. 3 is a longitudinal section on the line 3 3 of Fig. 2. Fig. 4 is a longitudinal section on the line 4 4 of Fig. 2.

Referring specifically to the drawings, the base of the nozzle is indicated at 6 and has a bore 7, through which the water passes. An interior thread 8 is also provided for connection with a hose or other source of water-supply. The front end of the base has a central opening, which is threaded and into which a stem 9 is screwed. Around said opening and concentric therewith the base has a number of openings 10 extending from its bore 7 to the outside. The stem 9 has a central bore 11, forming a water-passage which communicates with the bore 7. It is also threaded on the outside for a purpose to be described, and its outer end is enlarged, as at 12, and receives the tip 13, which forms the discharge end of the nozzle. The tip screws onto the outer end of the part 12 of the stem 9 and has a central bore 14 in alinement with the bore 11. The central discharge is therefore from the base through the bores 11 and 14. The tip can be removed and replaced by one having a smaller bore if it is desired to reduce the size of the central stream.

At 15 is indicated a sleeve, which is screwed on the stem 9 and is spaced from the base by a washer 16. The sleeve has a flaring annular groove 17, at the bottom of which are a number of openings 18, which are in alinement with the openings 10. A sleeve 19, similar to the one just described and spaced therefrom by a washer 20, is also screwed on the stem. This sleeve has inclined sides 21, coinciding with the flaring wall of the groove 17, and also has a flaring groove 22 and openings 23, similar in all respects to those in the sleeve 15, the openings 23 and 18 being in alinement.

At 24 is indicated a washer for spacing the sleeve 19 from the enlarged end 12 of the stem 9, which has sloping sides 25 extending parallel to the flaring walls of the groove 22.

The water passes through the openings 10 and is discharged laterally through the space 26 between the base 6 and sleeve 15 and also through the space 27 between the sleeves and the space 28 between the sleeve 19 and the enlarged portion 12 of the stem 9. The flaring walls of the groove cause the water to be discharged at an oblique angle to the central stream, except the stream issuing from the passage 26, which is at substantially a right angle to the central stream. This arrangement is especially useful in connection with a fire-extinguishing hose, as the stream from the passage 26 forms a water shield in front of the fireman handling the hose. The utility of the central stream, with the lateral streams at an oblique angle thereto, is obvious.

The upper end of the base and each sleeve is threaded to receive rings 29, which can be screwed up to extend over and close the outer ends of the passages 26, 27, and 28, one ring being provided for each, so that any one or all can be closed. The rings can also be adjusted to partly close the passages if a fine spray is desired. The central stream can be shut off by a valve 30, which may be of any suitable construction, an ordinary butterfly-valve being shown. This control of the discharge-passages gives the nozzle a wide range of usefulness. The nozzle will be found very effective in connection with a jet-condenser and can also be used as a lawn-sprinkler.

Slight changes in the several parts described may be made without departing in the least from the spirit and scope of the invention, and I do not wish to limit myself specifically to the construction shown.

What I claim as new, and desire to secure by Letters Patent, is—

1. A nozzle comprising a base portion having a central discharge-tube leading therefrom and openings around said tube, a series of sleeves on the tube having inner recesses communicating with said openings, the sleeves being spaced to form lateral discharge-openings, and rings on the outside of the sleeves movable over said spaces, to open or close the same.

2. A nozzle comprising a base having openings to the outside, a tubular stem screwed into the base, a series of spaced sleeves on the stem having openings in alinement with the openings in the base, and means for independently closing the spaces between the sleeves.

3. A nozzle comprising a base having openings to the outside, a tubular stem screwed into the base, a series of spaced sleeves on the stem having flaring grooves and openings, the latter being in alinement with the openings in the base, and means for independently closing the spaces between the sleeves.

4. A nozzle comprising a base having openings to the outside, a tubular stem screwed into the base, a series of spaced sleeves having flaring grooves and openings, the latter being in alinement with the openings in the base, and rings on the sleeves for closing the spaces between them.

In testimony whereof I have signed my name to this specification in the presence of two subscribing witnesses.

CARL R. CULLEY.

Witnesses:
   GEO. W. BILTON,
   GEORGE M. BADING.